United States Patent [19]
Cotsakis et al.

[11] Patent Number: 6,120,869
[45] Date of Patent: *Sep. 19, 2000

[54] PRESSURE SENSITIVE TAPE FOR FORMING WATER-TIGHT FIELD JOINTS IN RUBBER MEMBRANES

[75] Inventors: Daniel John Cotsakis; Ronald Lynn Senderling, both of Carlisle; Nicholas John Shears, Mechanicsburg, all of Pa.

[73] Assignee: Carlisle Companies Inc., Syracuse, N.Y.

[*] Notice: This patent is subject to a terminal disclaimer.

[21] Appl. No.: 08/995,818

[22] Filed: Dec. 22, 1997

Related U.S. Application Data

[63] Continuation of application No. 08/821,588, Mar. 20, 1997, Pat. No. 5,733,621, which is a continuation of application No. 08/640,112, Apr. 30, 1996, abandoned, which is a continuation of application No. 08/336,590, Nov. 9, 1994, abandoned.

[51] Int. Cl.$^7$ .............................. B32B 7/12; C08L 23/16; C08L 23/22; C08L 23/28
[52] U.S. Cl. .................... 428/42.3; 428/355 AK; 428/355 BL; 428/447; 428/451; 524/521; 524/528; 525/235; 525/240
[58] Field of Search ............................ 428/42.3, 355 AK, 428/355 BL, 447, 451; 524/521, 528; 525/235, 240

[56] References Cited

U.S. PATENT DOCUMENTS

| | | | |
|---|---|---|---|
| 4,742,119 | 5/1988 | Close | 525/211 |
| 4,855,172 | 8/1989 | Chiu | 428/57 |
| 5,234,987 | 8/1993 | Hubbard et al. | 524/505 |
| 5,242,727 | 9/1993 | Bridell et al. | 428/42 |
| 5,686,179 | 11/1997 | Cotsakis et al. | 428/343 |
| 5,733,621 | 3/1998 | Cotsakis et al. | 428/343 |

*Primary Examiner*—Donald R. Wilson
*Attorney, Agent, or Firm*—Rader, Fishman & Grauer PLLC

[57] ABSTRACT

An adhesive roofing tape is based on a combination of brominated butyl rubber and EPDM. A non-diene block terpolymer is interspersed in the cross-linked polymer network. A plasticizer and tackifier are included to provide resiliency and permanent tack. An important aspect of the invention is to use a high molecular weight polyisobutylene plasticizer and a peroxide curing system. Rapid crosslinking without concomitant rapid degradation of the brominated butyl rubber occurs and some limited degradation of the plasticizer contributes to surface tack. A method of making the adhesive roofing tape is also provided.

3 Claims, 1 Drawing Sheet

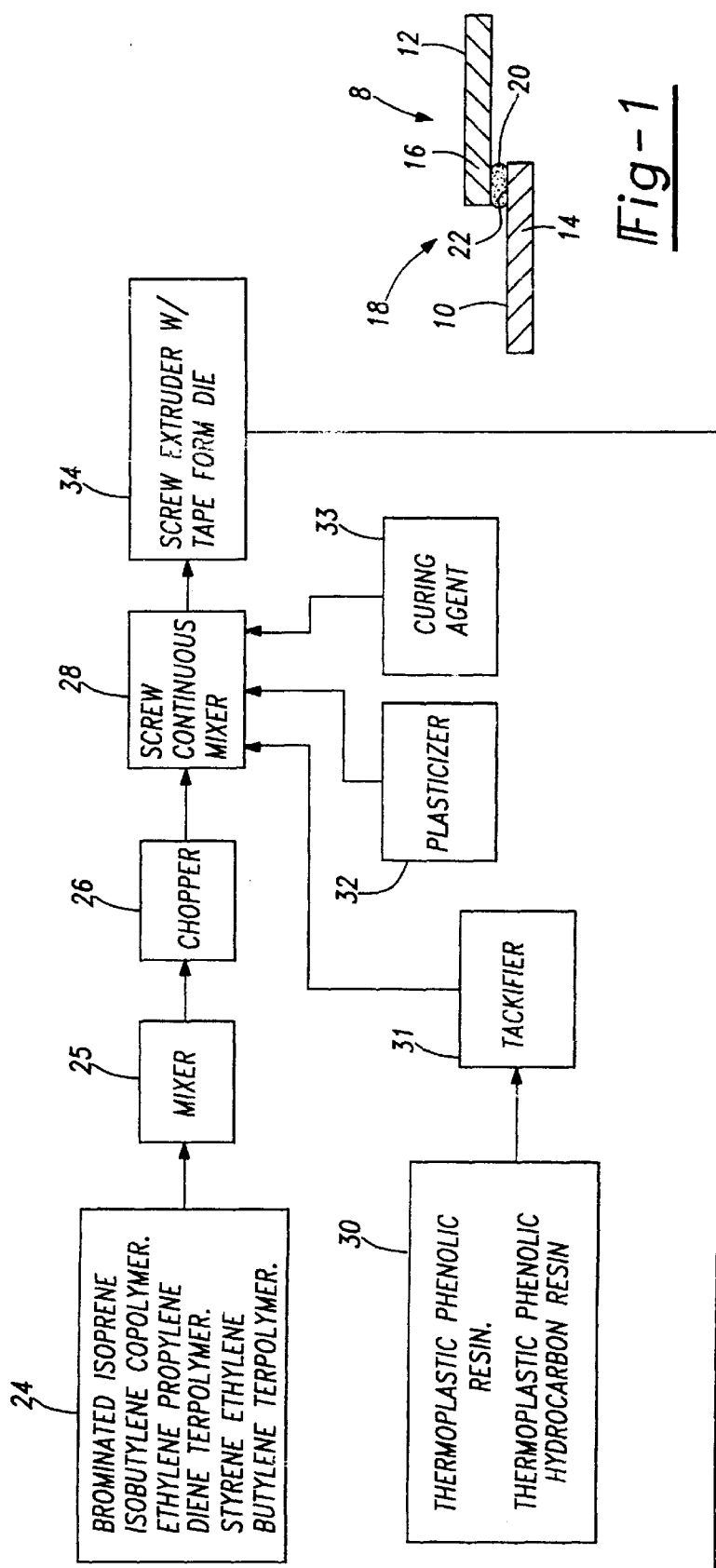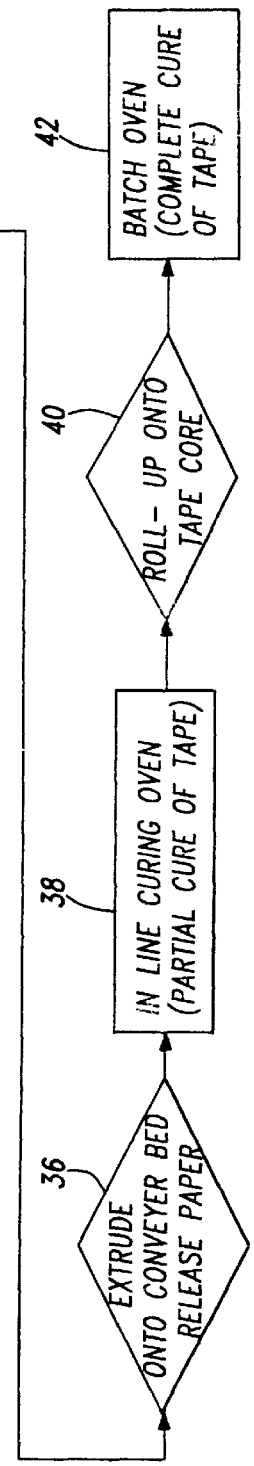

PRESSURE SENSITIVE TAPE FOR FORMING WATER-TIGHT FIELD JOINTS IN RUBBER MEMBRANES

This application is a continuation of U.S. patent application Ser. No. 08/821,588 filed Mar. 20, 1997, now U.S. Pat. No. 5,733,621, which is a continuation of U.S. patent application Ser. No. 08/640,112 filed Apr. 30, 1996, now abandoned, which is a continuation of Ser. No. 08/336,590 filed Nov. 9, 1994, now abandoned.

FIELD OF THE INVENTION

The present invention relates generally to adhesive materials used to join membranes and, more specifically, to splicing tapes which remain tacky after they are substantially fully cured.

BACKGROUND OF THE INVENTION

A number of techniques have been used over the years to join individual sheets of roofing materials. As will be appreciated by those skilled in the art, rubber membrane roofing materials are flat sheets of either single-ply or multiple-ply sheets formed of polymeric materials such as ethylene propylene diene monomer or isoprene isobutylene copolymer. These sheets are typically provided in large rolls of material of standard widths. After a section of sheeting material is applied to a roof surface, a second section is laid down partially overlapping the first section. This overlap is critical to ensure that a gap is not created between the sheets which would allow water to penetrate the roof surface.

In order to create a water-tight seal between the adjacent, overlapping roofing sheets, it is necessary to create a water-impervious bond at the splice or lap-joint. This is generally achieved by interposing an adhesive between the two roofing sheets at the region of overlap. The surfaces to be bonded together may be cleaned prior to application of the adhesive using a solvent or the like to enhance the bonding process and a primer may be applied to the cleaned surfaces to further increase the bond strength of the adhesive.

In some applications a liquid contact adhesive has been applied to one or more of the roofing sheets at the lap-joint which is then allowed to dry. The sheets are then overlapped and pressure is applied to cause the contact adhesive to bond the two sheets together. After the two sheets are joined in this manner, a caulking material may be used along the edge of the top layer at the joint and/or internal to the lap-joint (ref U.S. Pat. No. 4,849,268) in order to provide additional protection against water intrusion.

Another technique for joining two sheets of roofing material involves the use of adhesive roofing tapes. These tapes are designed to take the place of liquid roofing adhesives. Conventional tapes are provided as a roll having a release liner. The tape is separated from the backing material and is applied to the surface of the roofing sheet at the region where the lap-joint is to be formed. It will be understood that the tape is interposed between the overlapping surfaces of the roofing sheets along the entire length of the joint.

There are a number of important requirements for quality adhesive roofing tapes. Most importantly, they must provide a good water-tight bond at the lap-joint. In addition, they must resist environmental degradation for many years; a premature failure of the tape may result in extensive water damage. It is important that the tape retain some flexibility so that the lap-joint does not fail as a result of thermal expansion and contraction of the roofing sheets.

A number of prior art roofing tapes have been proposed. One type is an uncured strip of elastomeric material which is interposed between the roofing sheets and which cures thereafter by exposure to normal solar heat. Another type remains uncured throughout its service life. A third type of roofing tape is partially or substantially fully cured in the factory prior to its application to the roof.

Several examples of roofing tapes appear in the prior art patent literature. In U.S. Pat. No. 4,588,637 entitled, "Adhesive Composition" there is disclosed a membrane adhesive tape comprising a layer of butyl rubber-based material formed by compounding a minor portion of a butyl rubber copolymer, a curing agent for the butyl rubber, carbon black, and a major portion of a tackifier which forms a surface tack on the tape. The tape is pre-cured prior to use.

In U.S. Pat. No. 5,242,727 entitled, "Adhesive Composition and Method for Providing Water-Tight Joints in Single-Ply Roofing Membranes" a roofing membrane adhesive tape is disclosed comprising substantially equal amounts by weight of (1) a rubbery polymer comprising a blend of an ethylene-propylene-diene terpolymer, a halogenated butyl rubber or a halogenated co-polymer of p-methylstyrene and isobutylene, and polyisobutylene and (2) a compatible tackifier. The composition is fully vulcanized prior to use.

Additional such compositions are shown in U.S. Pat. No. 4,742,119 entitled, "Protective and Adhesive Compositions"; U.S. Pat. No. 4,881,996, "entitled, Splice Adhesive for EPDM Roofing and Splicing Method Employing Same"; and U.S. Pat. No. 4,601,935 entitled, "EPDM Laminate."

A number of difficulties have been encountered with commercially available roofing tapes. Roof curing type tapes have shown heat related creep failure tendencies prior to full cure and tend to cure to an unusable state during storage. Uncured tapes suffer from poor heat resistance plus the above mentioned creep failure problems. As a group, only the factory cured tapes have shown reliable performance. However, many of these tapes suffer from bleeding of tackifier into the vulcanized membrane, resulting in the accumulation of dirt and staining of the membranes at the splice, leaving a porous tape film. In addition many commercial tapes often have reduced tack at temperature extremes. Some have poor resistance to UV light.

Problems have also been encountered with splitting and tearing of the release paper as it is removed from the tape in the field. Also, the tape often "jumps" across the roll between opposed paper surfaces as it is unrolled. It is believed that these latter problems are due to the inability to maintain consistency in the processing techniques.

Accordingly it is an object of the present invention to provide an adhesive for joining together two roofing membranes which substantially reduces the bleeding of liquid components into the membranes.

It is another object of the present invention to provide such an adhesive in the form of a high-tack roofing tape which has good processing characteristics and which has high UV light resistance.

It is still another object of the present invention to provide an adhesive roofing tape having high temperature creep resistance, good tensile strength and good elongation characteristics.

DRAWINGS

These and other objects, advantages and features of the invention will become apparent in connection with the detailed description of the invention with reference to the drawings.

BRIEF DESCRIPTION OF THE DRAWINGS

FIG. 1 is a cross-section of two roofing membranes which are bonded together by the roofing tape of the present invention.

FIG. 2 is a flow chart illustrating the method of forming the adhesive roofing tape of the present invention.

SUMMARY OF THE INVENTION

In one aspect the present invention provides a high-tack, pressure sensitive roofing tape for use in forming water-tight joints in membranes, comprising a halogenated isoprene isobutylene copolymer, an ethylene propylene diene terpolymer, a polyisobutylene plasticizer, a tackifier, and a peroxide curing agent, wherein the halogen of the halogenated isoprene isobutylene copolymer is effective in protecting the isobutylene groups of the halogenated isoprene isobutylene copolymer and reduces the rate of breakdown by the peroxide curing agent, and wherein the peroxide curing agent has the capacity to partially depolymerize both the plasticizer and the halogenated isoprene isobutylene copolymer and is effective in depolymerizing the plasticizer at a rate more rapid than the rate of depolymerization of the halogenated isoprene isobutylene copolymer by the peroxide curing agent such that the depolymerized plasticizer contributes to the tack of the tape.

In still another aspect the present invention provides a pressure sensitive roofing tape for use in forming water-tight field joints in rubber membranes, comprising brominated isoprene isobutylene copolymer, ethylene propylene diene terpolymer, styrene ethylene butylene block terpolymer, polyisobutylene plasticizer, thermoplastic phenolic resin tackifier, thermoplastic hydrocarbon resin tackifier, and curing agent.

In still another aspect the present invention provides a method of making a pressure sensitive roofing tape for use in forming water-tight field joints in rubber membranes, comprising the steps of combining brominated isoprene isobutylene copolymer, ethylene propylene diene terpolymer, and styrene ethylene butylene block terpolymer in a mixer to form a base polymer mix; introducing the base polymer mix into a continuous mixing extruder; sequentially adding an admixture of polyisobutylene plasticizer, thermoplastic phenolic resin tackifier and thermoplastic hydrocarbon resin tackifier to the base polymer mix in the continuous mixing extruder; adding a curing agent to the base polymer mix in the continuous mixing extruder, wherein the base polymer mix, the polyisobutylene plasticizer, the thermoplastic phenolic resin tackifier, the thermoplastic hydrocarbon resin tackifier and the curing agent are processed in the continuous mixing extruder to form an adhesive tape compound; extruding the adhesive tape compound onto a conveyor fed release paper; partially curing the adhesive tape on the release paper in a continuous curing oven; rolling the partially cured adhesive tape and the release paper onto a tape core to form a tape roll; and heating the tape roll in a batch oven to complete the cure of the adhesive tape such that the adhesive tape remains tacky.

DETAILED DESCRIPTION OF THE PREFERRED EMBODIMENTS

Referring now to FIG. 1 of the drawings, roof sheeting 8 is shown generally (not to scale) having roofing membranes or sheets 10 and 12 with regions 14 and 16 overlapped to form lap-joint 18. As will be appreciated by those skilled in the art, a number of materials are used in the industry to form roofing sheets 10 and 12 such as EPDM which provides a barrier against water and provides good durability. In order to form a water-impervious seal at lap-joint 18, adhesive roofing tape 20 is interposed between sheets 14 and 16. Roofing tape 20 is preferably placed on surface 22 of membrane 10 whereupon region 16 of sheet 12 is placed on top of roofing tape 20. Pressure may then be applied to lap joint 18 to enhance the surface contact between tape 20 and sheets 10 and 12. As will be explained more fully hereinafter, tape 20 has a surface tack which contributes to the superior adhesive properties of the tape.

In the most preferred embodiment, tape 20 includes a polymeric material which is based on a combination of brominated butyl rubber and ethylene propylene diene terpolymer to produce a cross-linked polymer network. Interspersed within this matrix, styrene ethylene butylene block terpolymer synergistically enhances the thermoplastic properties for improved processing without affecting the brominated butyl rubber/ethylene propylene diene terpolymer cross-linked network structure. Tape 20 also includes a significant portion of a high molecular weight plasticizer which provides added resiliency to the composition without producing bleeding of tape 20 into roofing sheets 10 and 12 which is common in formulations that rely on low molecular weight tackifiers. Surface tack in the present invention is provided through the use of a thermoplastic phenolic resin tackifier and a thermoplastic non-phenolic resin tackifier. Due to the presence of the high-molecular weight plasticizer, relatively small amounts of these tackifiers can be used which reduces bleed of the tackifiers onto sheets 10 and 12.

The present invention further utilizes a peroxide curing agent which, in combination with the halogenated butyl rubber component, permits rapid cross-linking without a concomitant rapid degradation of the brominated butyl rubber. The use of a high molecular weight plasticizer, a peroxide curing agent and a halogenated butyl rubber allows some limited degradation of the plasticizer which then contributes to surface tack. Finally, carbon black is used as a filler, colorant, ultraviolet light absorber and reinforcing agent.

In this manner, a high-tack roofing tape 20 is provided which has good processing characteristics, high UV light resistance, excellent high temperature creep resistance, good tensile strength and good elongation characteristics all without the problems of bleed-through common with conventional tapes.

Referring now to FIG. 2 of the drawings, brominated isoprene isobutylene copolymer, ethylene propylene diene terpolymer, and styrene ethylene butylene block terpolymer are provided at step 24. Although brominated isoprene isobutylene copolymer is preferred for use in the present invention, other halogenated isoprene isobutylene copolymers may be suitable or desirable in a given application such as chlorinated butyl rubber or other halogenated polyisobutylene copolymers. One preferred brominated butyl rubber is sold under the trade name "Bromobutyl 2030" by Miles, Inc. As will be appreciated by those skilled in the art, the isoprene units comprise about 3% of the bromobutyl polymer. The bomobutyl polymer contains about 2% bromine by weight, with all the bromine attached to the isoprene units. It is preferred that the brominated isoprene isobutylene copolymer have a Mooney viscosity (ML1+8 at 125° C.) of from about 27 to about 51 and an average molecular weight of from about 300,000 to about 450,000.

Ethylene propylene diene terpolymer is preferred for use in the present invention. A particularly preferred EPDM may be obtained from Uniroyal under the trade name "Royalene 3275B". EPDM terpolymers having ethylene to propylene ratios of 80/20 to 50/50, number average molecular weights of 100,00 to 280,000 and ethylidene norbornene, 1,4-hexadiene or dicyclopentadiene as the diene may be suitable in some applications. It is preferred that the ethylene propylene diene terpolymer have an average molecular weight of from about 180,000 to about 220,000, an ethylene to propylene ratio of 58/42 and ethylidene norbornene as the diene.

A non-diene block terpolymer, most preferably, styrene ethylene butylene block terpolymer, is also an important component in the initial polymer mix. It increases the thermoplastic characteristics of the base polymer mix which impacts processability and the dynamic thermal characteristics of tape 20 in the field. It will be appreciated that the styrene ethylene butylene block terpolymer does not include any non-conjugated diene units. Other non-diene block terpolymers may be suitable in this particular application such as styrene butadiene block terpolymers, styrene isoprene block terpolymers and vinyl acetate, ethylene copolymers. A preferred styrene ethylene butylene block terpolymer is sold under the trade name "Kraton G1657" by the Shell Chemical Company. It is preferred that the styrene ethylene butylene block terpolymer have an average molecular weight of from about 40,000 to about 250,000 and a styrene to ethylene-butylene ratio of 13/87.

In addition to the foregoing components, a filler, preferably carbon black which also serves as a colorant for the adhesive tape, is provided at step 24. Other fillers may be preferable or desirable in a particular application with or without carbon black such as clay, calcium carbonate, other silicates, precipitated or fumed silicas, ground coal or additives to impart flame retardant properties. Fibers or fabric may also be incorporated into the tape to obtain certain physical properties.

Referring again to FIG. 2 of the drawings, the brominated isoprene isobutylene copolymer, ethylene propylene diene terpolymer, styrene ethylene butylene block terpolymer and the carbon black are combined in a mixer at step 25, preferably a Banbury-type intensive batch mixer, where they are mixed and blended to form a rubbery mass in the conventional manner of rubber compounding which will be apparent to those skilled in the art. The resultant mass is then chopped using a conventional rubber chopper at step 26. Again, the equipment used and the resultant particle size are conventional and are commonly known in the art. The resultant base polymer mix is then fed to a screw continuous mixer, preferably a twin screw mixer, at step 28.

The relative concentrations of the components of the present invention are important to the overall performance characteristics of adhesive tape 20, although some deviation from the preferred concentrations may be tolerated. Accordingly, the base polymer mix which is fed to the continuous mixing extruder at step 28 has the following preferred formulations (all percentages approximations by weight):

Brominated Isoprene Isobutylene Copolymer
  Preferred: 28% to 80%
  Most preferred: 33% to 67%
Ethylene Propylene Diene Terpolymer
  Preferred: 14% to 60%
  Most preferred: 17% to 50%
Styrene Ethylene Butylene Block Terpolymer
  Preferred: 3% to 17%
  Most preferred: 4% to 17%
Carbon Black:
  Preferred: 0% to 17%
  Most preferred: 14% to 17%

As the foregoing base polymer moves through the continuous mixing extruder at step 28, additional components are added in stages to the screw mixer as shown in blocks 30, 31, 32 and 33 of FIG. 2. These additional components are tackifier, preferably a combination of thermoplastic phenolic resin tackifier and a non-phenolic thermoplastic hydrocarbon resin tackifier, said combination done at stage 30 then added to mixer at stage 31; a high molecular weight plasticizer, preferably polyisobutylene plasticizer at stage 32; and a peroxide curing agent at stage 32. These additional components are added to the base polymer mix through ports in the side of the screw mixer at different distances or stages along the barrel; the high volume of plasticizer makes a staged addition to the continuous mixing extruder preferable. In terms of the concentrations of these components in the final blended composition which is extruded at step 34 (i.e. the adhesive tape compound), the polymer base mix (the admixture of brominated isoprene isobutylene copolymer, ethylene block propylene diene terpolymer, styrene ethylene butylene terpolymer and carbon black) forms preferably from about 28 to about 50 percent by weight and more preferably from about 34 to about 47 percent by weight of the final extruded blend; polyisobutylene plasticizer comprises preferably from about 35 to about 55 percent by weight and more preferably from about 40 to about 50 percent by weight of the final extruded blend; tackifier forms preferably from about 10 to about 40 percent by weight and more preferably from about 11 to about 30 percent by weight of the final extruded blend. Peroxide curing agent is added to the blend of the base polymer mix and the additional components at a concentration of from about 0.2 to about 1.2 percent by weight and more preferably from about 0.3 to about 0.5 percent by weight based on the total weight of the final blend. Stated in another way, the extruded blend has the following formulation (approximate percentages by weight):

Brominated Isoprene Isobutylene Copolymer
  Preferred: 10% to 35%
  Most preferred: 11% to 29%
Ethylene Propylene Diene Terpolymer
  Preferred: 5% to 25%
  Most preferred: 6% to 22%
Styrene Ethylene Butylene Terpolymer
  Preferred: 1% to 10%
  Most preferred: 1% to 8%
Carbon Black:
  Preferred: 0% to 10%
  Most preferred: 1% to 8%
Polybutene Plasticizer:
  Preferred: 35% to 55%
  Most preferred: 40% to 50%
Thermoplastic Phenolic Resin Tackifier:
  Preferred: 2% to 20%
  Most preferred: 11% to 15%
Thermoplastic Hydrocarbon Resin Tackifier:
  Preferred: 2% to 20%
  Most preferred: 3% to 15%
Peroxide Curing Agent:
  Preferred: 0.2% to 1.2%
  Most preferred: 0.3% to 0.5%

The preferred tackifiers are, as stated, thermoplastic phenolic resin tackifier and thermoplastic hydrocarbon (non-phenolic) resin tackifier, and most preferably a combination of both types of tackifiers. The preferred thermoplastic phenolic resin tackifiers for use in the present invention are non-heat reactive phenol-novolac resins and have an average ring and ball melting point of from about 70° C. to about 120° C. and more preferably from about 85° C. to about 110° C. Most preferred for use herein are SP-1068 and SP-1077.

The preferred non-phenolic hydrocarbon thermoplastic resin tackifiers are polycyclic aliphatic hydrocarbon resins having slight to no unsaturation ("fully saturated") and have an average ring and ball melting point of about 70° C. to about 140° C. and more preferably from about 85° C. to about 110° C. Most preferred for use herein are Escorez 1310, Escorez 5300 and Piccopale 100. A particularly preferred combination of the two types of tackifiers is a combination of "SP-1068" which is available from Schenectady Chemicals, Inc., and "Escorez 1310" which is available from Exxon.

It is an important aspect of the present invention to include a high molecular weight plasticizer. Most preferred is a polyisobutylene plasticizer having an average molecular weight of between about 2,000 and 65,000 and more preferably between about 2,050 and about 2,500. Other suitable high molecular weight plasticizers for use in the present invention are Indopol H-1500, Vistanex LM-MS and Vistanex LM-MH. Most preferred is the polyisobutylene plasticizer sold by Amoco as "Indopol H-1900."

A number of peroxide curing agents are suitable for use in the present invention such as dicumyl peroxide and other diacyl and dialkyl peroxides and peroxyketals. Most preferred is the dicumyl peroxide product DiCup 40C which is available from Hercules, Inc. It will be appreciated that commercial preparations of peroxide curing agents typically include a carrier such as calcium carbonate. The percentages set forth above with respect to the concentration of curing agent do not include any contribution by fillers compounded with said peroxide curing agent in such commercial preparations.

As stated above, the peroxide curing agent, in combination with the halogenated butyl rubber component, permits rapid cross-linking without a concomitant rapid degradation of the brominated butyl rubber. The use of a high molecular weight plasticizer, a peroxide curing agent and a halogenated butyl rubber allows some limited degradation of the plasticizer which then contributes to surface tack.

Depending on the raw material feed rates and screw speed of the twin screw continuous mixer, complete mixing will generally be completed in from about 1 to about 4 minutes; it is important that the components be well-blended prior to extrusion.

Referring again to FIG. 2 of the drawings, the tape compound is extruded with a single screw extruder through a conventional tape-form die to conveyor-fed release paper at step 36. Most preferably, 2-side silicone coated release paper is utilized in the customary manner. At step 38 the resultant uncured tape is partially cured in an in-line curing oven at between about 145 degrees C. to about 175 degrees C. for approximately 1 to 3 minutes (i.e., the residence time of the tape in the oven). The partially cured tape on the release paper is then rolled onto a tape core at step 40. In order to finish the cure the rolled tape is then placed in a final cure oven at approximately 110 to 140 degrees C. for approximately 3 to 24 hours at step 42. The final tape product is substantially fully cured.

In application, rubber membrane roofing materials, flat sheets of either single-ply or multiple-ply sheets formed of polymeric materials such as ethylene propylene diene monomer or isoprene isobutylene copolymer, are provided. After a section of sheeting material is applied to a roof surface, a second section is laid down next to and partially overlapping the first section. This overlap is critical to ensure that a gap is not created between the sheets which would allow water to penetrate the roof surface.

As stated, in order to create a water-tight seal between adjacent, overlapping roofing sheets, a roll of adhesive tape made in accordance with the present invention is provided having a release liner. The tape is separated from the backing material and is applied to the cleaned and/or primed surface of the roofing sheet at the region where the lap-joint is to be formed. The tape is interposed between the overlapping surfaces of the roofing sheets along the entire length of the joint. Pressure may be supplied to the joint to effect a better seal of the materials.

It is to be emphasized that the use of a combination of a plasticizer and a tackifier in the present invention results in a significant reduction in the bleeding of tackifier into the membrane which reduces the accumulation of dirt and staining of the membranes at the splice. The adhesive tape of the present invention maintains high-tack notwithstanding wide fluctuations in temperatures which assists in maintaining a water-tight seal at the joint and provides good resistance to ultraviolet light. By reducing the amount of heat history the release paper is subjected to it has a reduced tendency to split and tear as it is removed from the tape. Tape "jump across" is also reduced in the present invention. Finally, the tape of the present invention has high temperature creep resistance, good tensile strength and good elongation characteristics.

EXAMPLES

The following examples are provided to further illustrate the invention and are not intended to limit the full scope of the patent claims.

In order to determine the affect of the molecular weight of the polyisobutylene plasticizer on the performance of the splice tape, laboratory batch mixer splice tape formulations were prepared, one using Indopol H-300 (average molecular weight of 1290), the other using Indopol H-1900 (average molecular weight of 2300) in accordance with the present invention. After being extruded and cured, both tapes were laminated to thin, white sheets of polyethylene film. The film/tape laminate was then suspended in a 116° C. oven for 7 days. After aging, it was observed that a significant amount of the H-300 had bled through the polyethylene film, leaving a liquid film on its surface. Little or no bleeding was observed with the tape containing Indopol H-1900. The adhesion performance to vulcanized EPDM membrane under cold weather conditions of the two formulations was comparable.

In order to determine the influence of the chemical type of plasticizer on the performance of the splice tape, laboratory batch mixer splice tape formulations were prepared, one using a low molecular weight liquid EPDM plasticizer (Trilene 67 from Uniroyal Chemical) and the other using Indopol H-1900. The Trilene 67 resulted in a stiffer, boardier tape and had the following affects on adhesion results. At 22° C. the Trilene 67 formulation had a peel adhesion of 4.11 lbs/in and the Indopol H-1900 had a peel adhesion of 12.08 lbs/in. At 70° C. the Trilene 67 had a peel strength of 1.35 lbs/in and Indopol H-1900 had a peel strength of 1.93 lbs/in. (The tests utilized EPDM membrane, solvent cleaned prior to tape application, bonded to itself, tape bonded membrane aged 24 hours at 22° C. before testing.)

In order to determine the affect of the blend ratio of the thermoplastic phenolic resin tackifier to the thermoplastic hydrocarbon resin tackifier on tape performance, baseline tape formulations were prepared in a laboratory batch mixer with the following blend ratios of the two resins. The following results were obtained:

|  | Formulation | | |
| --- | --- | --- | --- |
|  | A | B | C |
| Phenolic:Hydrocarbon blend ratio | 3:1 | 1:3 | 1:1 |
| Tack | Fair | Excellent | Excellent |
| Degree of Cure | Excellent | Poor | Very Good |
| Peel Adhesions |  |  |  |
| Test @ 22° C. | 7.44 lbs/in | 4.75 lbs/in | 7.78 lbs/in |
| Test @ 70° C. | 1.74 lbs/in | 0.22 lbs/in | 2.18 lbs/in |

(The tests utilized EPDM membrane, solvent cleaned prior to tape application, bonded to itself, tape bonded membrane aged 24 hours at 22° C. before testing.)

In order to determine the difference between batch production of the present invention and continuous mixing, a comparative test was performed with the following results:

|  | Batch Mixer | Continuous Mixer |
| --- | --- | --- |
| Appearance | Homogeneous mix with many discrete, pin-head sized lumps | Homogeneous mix free of any lumps |
| Peel Adhesion |  |  |
| Test @ 22° C. | 1.32 lbs/in | 6.34 lbs/in |
| Test @ 70° C. | 0.42 lbs/in | 1.97 lbs/in |

(The tests utilized EPDM membrane, solvent cleaned prior to tape application, bonded to itself, tape bonded membrane aged 24 hours at 22° C. before testing.)

Thus, it is apparent that there has been provided in accordance with the invention a method and apparatus that fully satisfies the objects, aims and advantages set forth above. While the invention has been described in connection with specific embodiments thereof it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed is:

1. A pressure-sensitive, adhesive roofing tape for use in forming water-tight field joints in roofing membranes, comprising:

from about 10 to about 35 percent by weight brominated isoprene isobutylene copolymer, from about 5 to about 25 percent by weight ethylene propylene diene terpolymer, from about 0 to about 10 percent by weight filler, from about 35 to about 55 percent by weight polyisobutylene plasticizer, from about 2 to about 20 percent by weight thermoplastic phenolic resin tackifier, from about 2 to about 20 percent by weight thermoplastic non-phenolic hydrocarbon resin tackifier, and from about 0.2 to about 1.2 percent by weight peroxide curing agent.

2. The pressure sensitive roofing tape of claim 1, wherein the peroxide curing agent is dicumyl peroxide.

3. The pressure sensitive roofing tape of claim 1, wherein the filler is carbon black.

* * * * *